(12) United States Patent
Onanian (10) Patent No.: US 6,738,191 B1
(45) Date of Patent: May 18, 2004

(54) ELEMENTARY COLLAPSIBLE MICROSCOPE

(76) Inventor: Richard A. Onanian, 85 Irving St, Arlington, MA (US) 02476

( * ) Notice: Subject to any disclaimer, the term of this patent is extended or adjusted under 35 U.S.C. 154(b) by 0 days.

(21) Appl. No.: 10/249,019

(22) Filed: Mar. 10, 2003

Related U.S. Application Data (60) Provisional application No. 60/319,144, filed on Mar. 14, 2002.

(51) Int. Cl.[7] .................. G02B 23/00; G02B 27/22; G02B 7/02; G02B 21/00
(52) U.S. Cl. .................. 359/368; 359/407; 359/474; 359/817; 359/408
(58) Field of Search ................ 359/368–390, 359/408, 474, 817

(56) References Cited

U.S. PATENT DOCUMENTS

| | | | | | |
|---|---|---|---|---|---|
| 2,943,409 | A | * | 7/1960 | Maiershofer | 40/366 |
| 4,095,874 | A | * | 6/1978 | Wallace | 359/804 |
| 4,568,148 | A | * | 2/1986 | Onanian | 359/485 |
| 4,729,635 | A | * | 3/1988 | Saferstein et al. | 359/804 |
| 4,737,016 | A | * | 4/1988 | Russell et al. | 359/801 |

* cited by examiner

*Primary Examiner*—Thong Nguyen
(74) *Attorney, Agent, or Firm*—Mark P. White (57) ABSTRACT

A microscope formed from a single, flat, relatively thin, injection molded plastic blank employs living hinge technology. The blank has eight living hinges that cooperate with slots, hooks, and detents, such that when folded in a prescribed sequence, produces a unitized microscope body.

20 Claims, 12 Drawing Sheets

ELEMENTARY COLLAPSIBLE MICROSCOPE

BACKGROUND OF INVENTION

This design allows the construction of an introductory elementary bench microscope at production costs that heretofore have not been possible. This microscope can be configured into a free-standing bench configuration, wherein the specimen is held on a slide by stage clips, and light reflected from an adjustable mirror through an opening in a stage subassembly, through the specimen, and through a lens in an eyepiece subassembly. Focus is accomplished by squeezing and releasing the eyepiece relative to the stage until the specimen is seen clearly.

In a hand-held configuration, the mirror is moved out of the light path, and light is directed from its source directly through the opening in the stage, through the specimen, and through the lens.

The unassembled scope maximizes space efficiency by allowing the greatest number of units to be packed and shipped in the smallest possible space. It also produces a high economic benefit as well as space utilization in cost pressured/space-starved classrooms.

The elongated, overlaying eyepiece offers a high degree of protection against cuts to face/hands from accidental breakage of glass microscope slides in typically hyperactive classroom environments.

In its erected, or bench state, all parts of the microscope are unitized and are integrally secured against accidental or careless dismantling. Most important, the design produces a platform microscope allowing near instant focusing capability—a feature sought after by both students and teachers.

Prior art microscopes have attempted to provide a simple, inexpensive, and easy-to-use microscope. Specifically, U.S. patent application Ser. No. 4,568,148 disclosed a hand-held microscope which accomplished some of the objectives of the present invention. However, the present invention adds the ability to be configured into a free-standing bench unit, with an adjustable mirror to reflect an external light source onto the specimen, including higher resolution, simplicity of focusing, and robust construction formerly not available in instruments of this class.

SUMMARY OF INVENTION

It is an object of the current invention to produce a microscope which is inexpensive, easy to use, rugged, and compact. It is a particular object of the invention to produce such a microscope in the form of a single substrate of material which can be assembled by folding and locking the elements of the microscope into place, producing a three-dimensional unit.

In accordance with one aspect of the invention, the folded elementary microscope contains four basic elements, all integrally formed in a substantially planar substrate, the elements separated from each other by living hinges.

In accordance with a second aspect of the invention, the elements include an eyepiece, a stage, an angle plate, and a base, wherein the eyepiece is hinged to the stage, the stage hinged to the angle plate, and the angle plate hinged to the base.

In accordance with a third aspect of the invention, a mirror is affixed to a mirror mounting panel hinged to the base.

In accordance with a fourth aspect of the invention, the eye piece is folded to a maximum acute first angle relative to the stage, wherein the angle is adjustable by the user.

In accordance with a fifth aspect of the invention, the stage is folded at a second angle relative to the angle plate.

In accordance with a sixth aspect of the invention, the angle plate is folded at a third angle relative to the base.

In accordance with a seventh aspect of the invention, means to restrain the eye piece at an angle less than or equal to said maximum acute angle are provided.

In accordance with an eighth aspect of the invention, means to affix the angle between the stage and the angle plate at a second angle are provided.

In accordance with a ninth aspect of the invention, means to affix the angle between the angle plate and the base at the third angle are provided.

In accordance with a tenth aspect of the invention, the microscope includes one or more external struts, each attached to the planar substrate by an external strut hinge, and one or more internal struts, each attached to the planar substrate by an internal strut hinge.

In accordance with an eleventh aspect of the invention, each external strut mates with a corresponding slot in proximity to the stage, and each internal strut mates with a corresponding slot in proximity to the angle plate.

In accordance with a twelfth aspect of the invention, a mirror opening is formed in the angle plate, and the mirror-mounting panel is slideably affixed within mirror opening.

In accordance with a thirteenth aspect of the invention the means to restrain the eye piece at an angle less than or equal to said maximum acute angle, the means to affix the angle between the stage and the angle plate at the second angle, and the means to affix the angle between the angle plate and the base at the third angle are all removable means.

BRIEF DESCRIPTION OF DRAWINGS

These, and further features of the invention, may be better understood with reference to the accompanying specification and drawings depicting the preferred embodiment, in which.

DETAILED DESCRIPTION

Figure 1A:
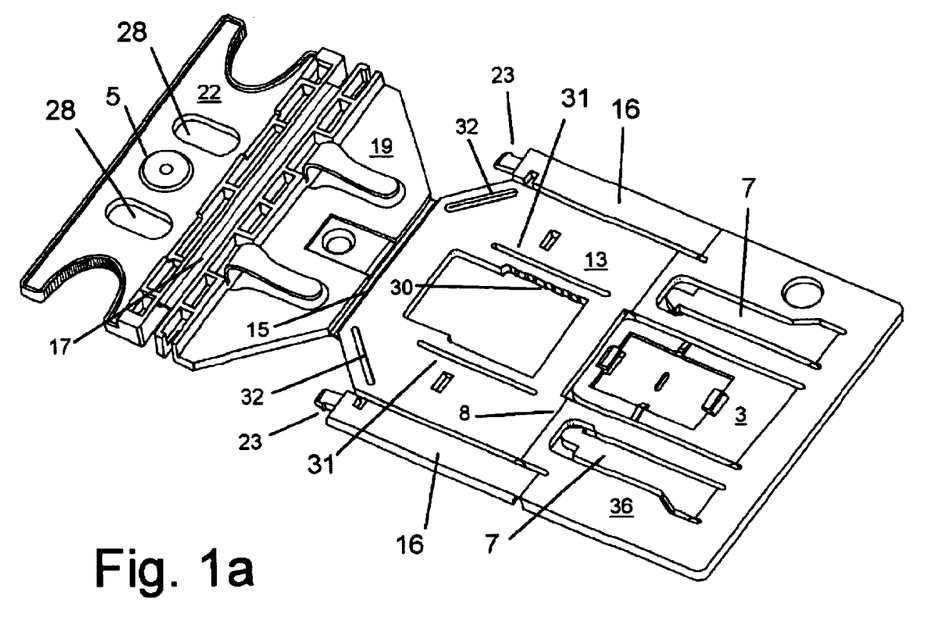
FIG. 1a depicts the microscope as produced by the mold, lying face up.

The microscope of the preferred embodiment consists of a number of elements, all of which are contained within a single, flat, relatively thin, injection molded plastic panel, or blank, which employs living hinge technology well known in the art. The preferred material used in this embodiment is polypropylene. The blank, as shown in FIG. 1, has eight living hinges that cooperate with slots, struts, and detents, such that when folded in a prescribed sequence, as will be described below, a unitized microscope body is produced.

Three major hinges separate the major subsections of the microscope: the eyepiece 22 is separated from the stage 19 by the upper hinge 17; the stage is separated from the angle plate 13 by the middle hinge 15, and the angle plate is separated from the base 36 by the lower hinge 8. Other living hinges allow the mirror holder 3, the internal struts 7, and the external struts 16 to bend away from the plastic blank. These hinges are named, respectively, the mirror hinge 37, the internal strut hinges 38, and the external strut hinges 39.

Figure 1B:
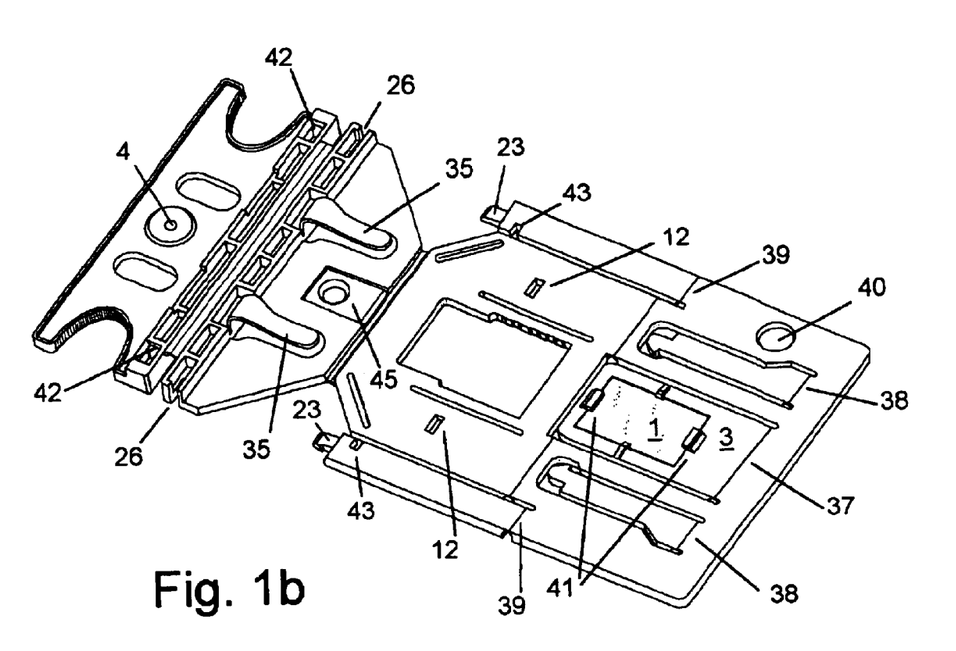
FIG. 1b depicts the microscope of FIG. 1a with the mirror and lens in place.

Referring now to FIG. 1b, a mirror 1 has been inserted into the mirror holder 3. Stage clips 35, polarizer eyepiece storage well 40, substage recess 45, and mirror clips 41, are integrally formed in the molded design, and obviate the need for separate manufacture and assembly. Only the lens itself and the mirror need be added to the blank to create the upright microscope.

The present design allows, the construction of a full functioning elementary microscope, having a focusable lens and an adjustable diffusion mirror, with a total of 3 elements: the blank, the lens, and the mirror. The microscope has applications in early science education for schools, as well as hobby, toy and novelty markets.

Assembly—Bench Configuration

The assembly can be understood by referring to FIGS. 1A through 7. Referring first to FIGS. 1A and 1B, it is seen that while the plate is in its flat orientation, face up, a mirror 1 is affixed to the small, linged panel, or mirror holder 3 by inserting under the end clips 41. A lens 4 is inserted into a receptacle 5 to form an ocular on the adjustable eyepiece 22. The receptacle is shown without the lens in FIG. 6A.

Figure 2:
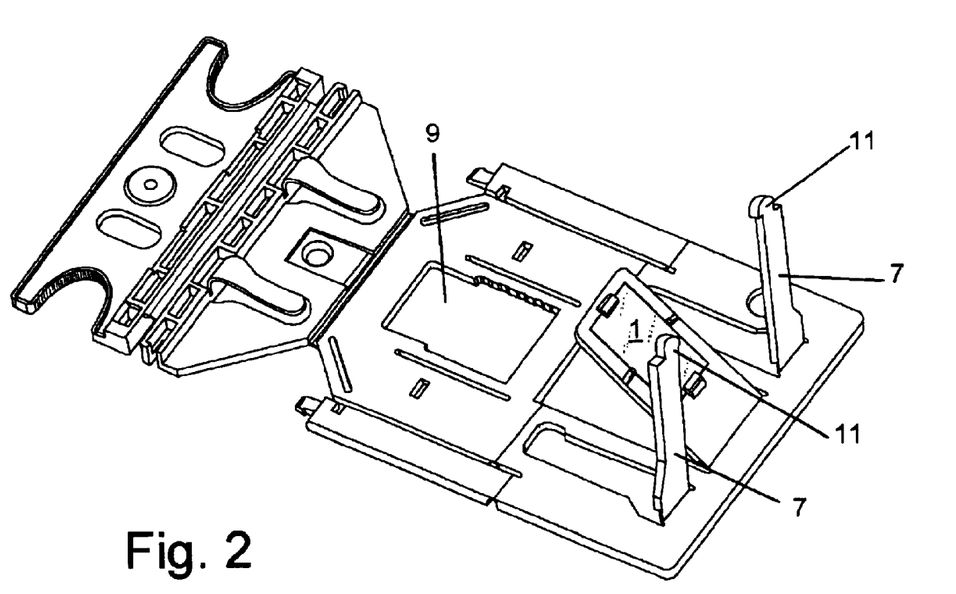
FIG. 2 depicts the microscope of FIG. 1b, with pair of internal struts folded up into an upright position, and the mirror holder at an approximate 45 degree angle.

Referring next to FIG. 2, the internal struts 7 are bent into an upright position, and the hinged panel 3, containing the mirror 1, is bent slightly in anticipation of its insertion into the mirror opening 9.

Figure 3:
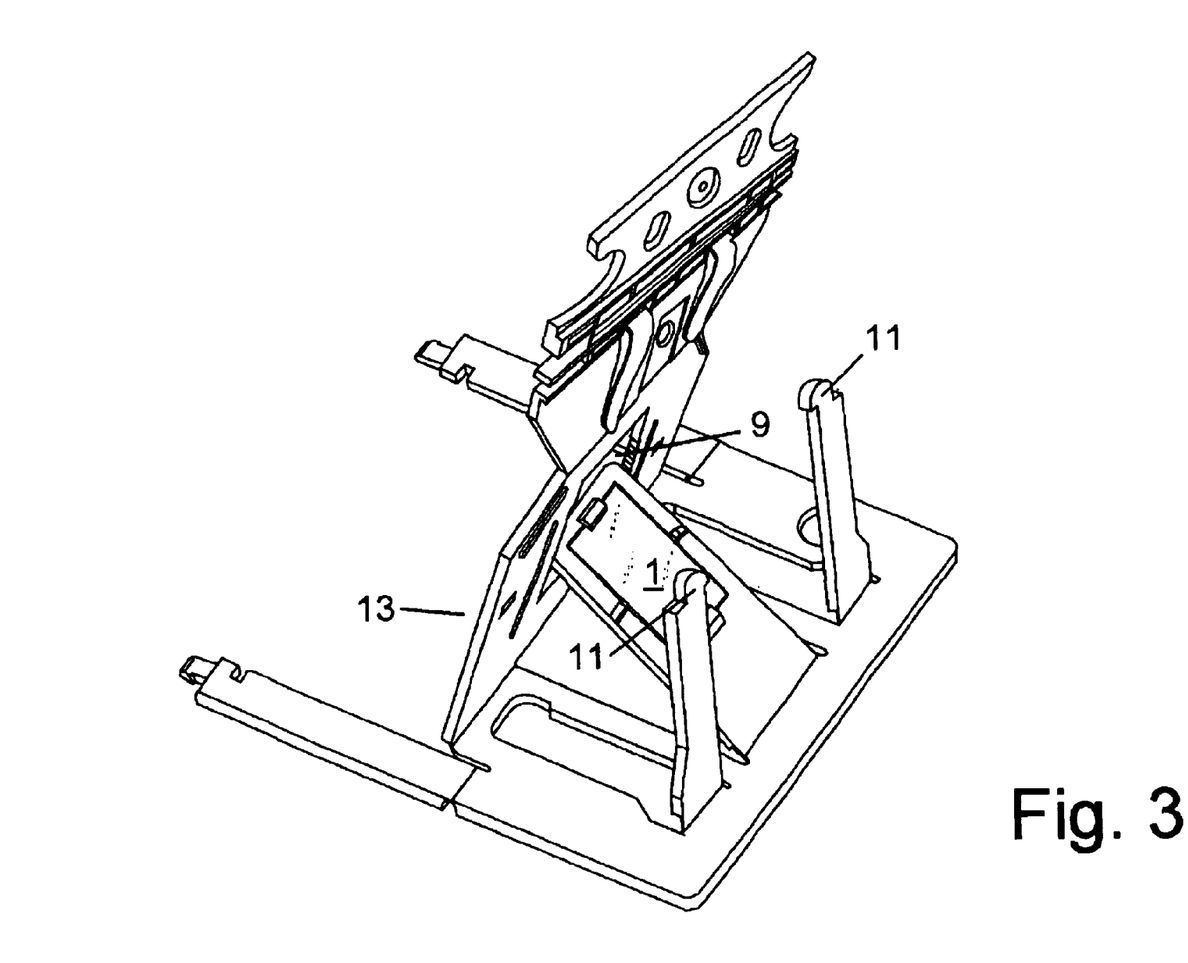
FIG. 3 depicts the microscope of FIG. 2, with the angle plate bent up from the base, and the mirror holder inserted into the mirror opening.

Referring next to FIG. 3, the angle plate 13 is bent up from the base, and the mirror holder inserted into the mirror opening. The mirror holder 3 is held in place by a series of detents 30, which appear in more detail in FIG 1a. The mirror may be adjusted to stay in any position from the base of the mirror opening, to the top of the detents, where the mirror opening narrows.

Figure 4:
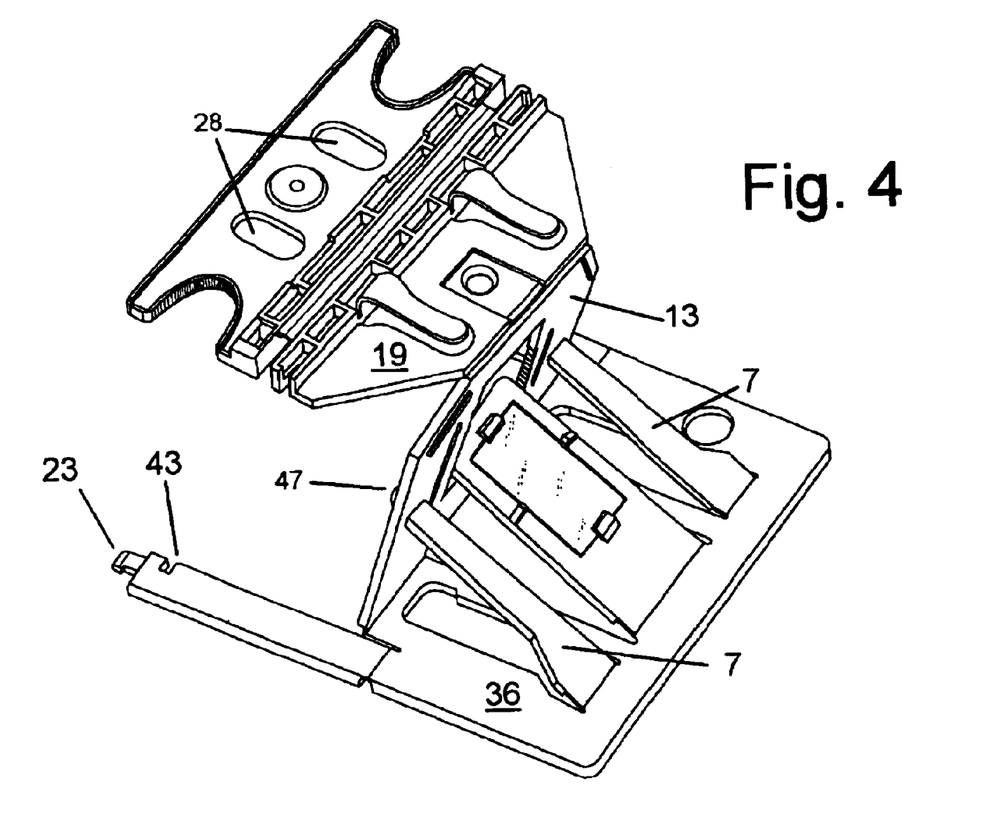
FIG. 4 depicts the microscope of FIG. 3, with the stage bent away from the angle plate, and the tips of the internal struts inserted lightly into the rectangular slots in the angle plate.

Referring now to FIG. 4, the stage and eyepiece, still disposed in a plane relative to each other, are folded back, so that the stage 19 is substantially parallel to the base 36, where it will remain when the assembly is complete. Also, the internal struts 7 have been inserted into the rectangular slots 12, stabilizing the relationship between the base 36 and the angle plate 13. Notches 47 at the tips of the internal struts 7 help to lock the internal struts into the rectangular slots 12.

Figure 5A:
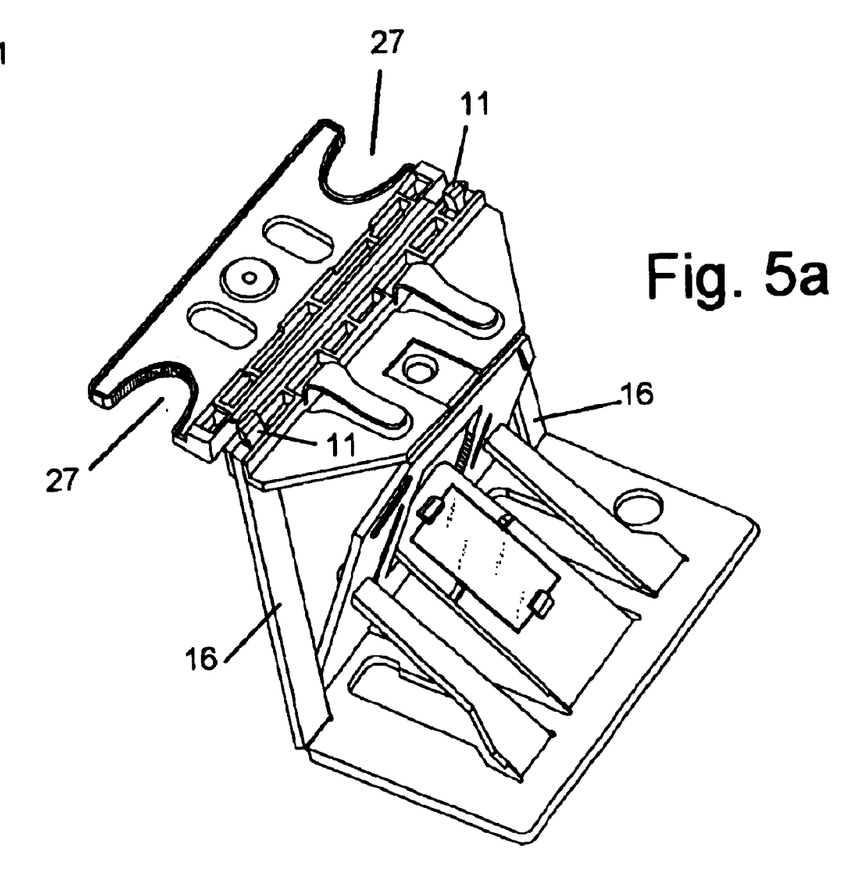
FIG. 5A depicts the microscope of FIG. 4 with the external struts inserted into slots in the stage.

Referring to FIG. 5A, the slots 43 of the external struts 16, as shown in FIG. 4, have been affixed to the slots 26 of the stage 19 so that the outside of the external struts are flush with the stage 19. Furthermore, the tips 23 of the external struts 16 protrude slightly above the stage. These external struts 16 contain notches 43 near the tips 23, which lock the external struts into the slots in the stage, stabilizing the assembly. Likewise the internal struts have tips 11 which mate with the rectangular slots 12 further stabilizing the microscope.

Figure 5B:
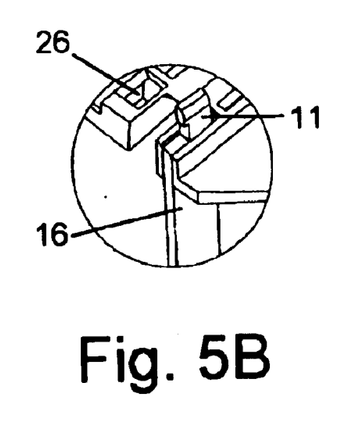
FIG. 5B depicts a detail of the stage and the eyepiece, showing the slot in the stage with the tip of one of the external struts inserted.
Figure 5C:
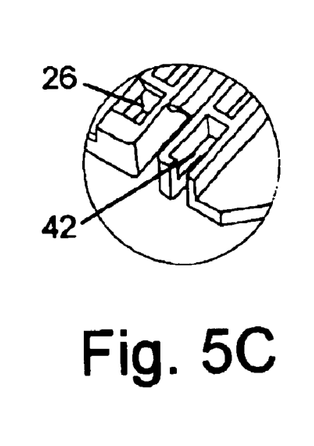
FIG. 5C depicts a detail of the stage and the eyepiece, showing a slot in the stage and a slot in the eyepiece, both for receiving the tip of one of the external struts.
Figure 7:
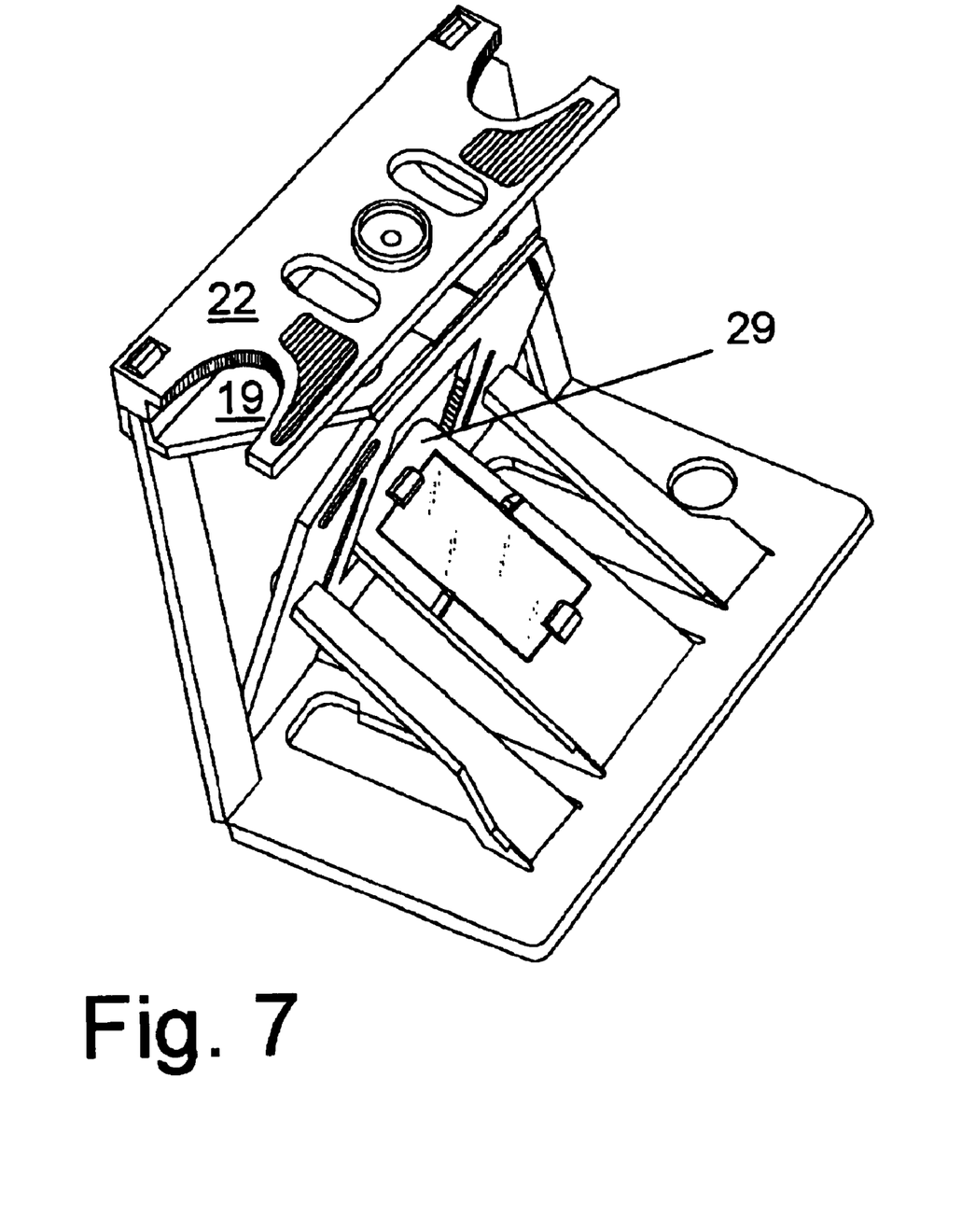
FIG. 7 depicts the microscope with the eyepiece parallel to the stage.

FIG. 5C depicts a detail view of the edge of the upper hinge, showing the stage slot 26, and the eyepiece slot 42. FIG. 5B shows the same detail, but with the tip 11 of the external strut inserted into the stage slot 26, revealing the tip 11 which mates with the eyepiece slot 26 when the eyepiece is folded to a position almost parallel with the stage, as shown in FIG. 7.

Figure 6A:
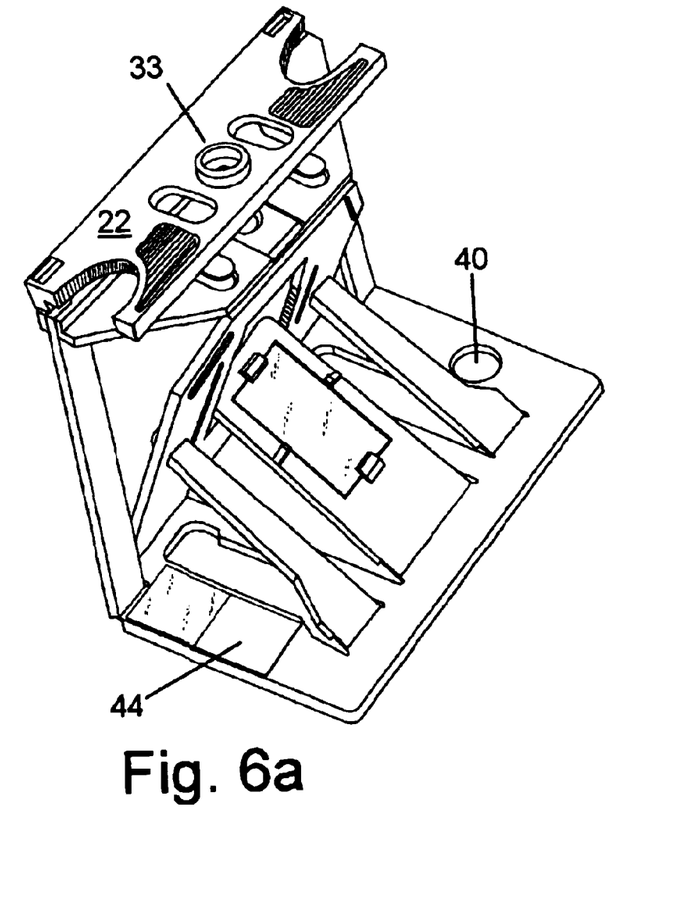
FIG. 6A depicts the microscope of FIG. 5 with the eyepiece bent over in proximity to the stage, and the tips of the external struts engaged with the eyepiece slots.

The assembly is completed, as shown in FIG. 6A, when the tips 11 of the external struts are inserted into the eyepiece slots 26, as shown in FIG. 5A and 5B, restraining the eyepiece 22 from opening more than the amount shown in this figure. Also shown in this figure are the tab pocket 44, which will hold either a reticle tab 45 or a polarizer tab 46, both of which are common accessories to microscopes, and well known in the prior art, and which are further described below.

Assembly—Hand-held Configuration.

Figure 8:
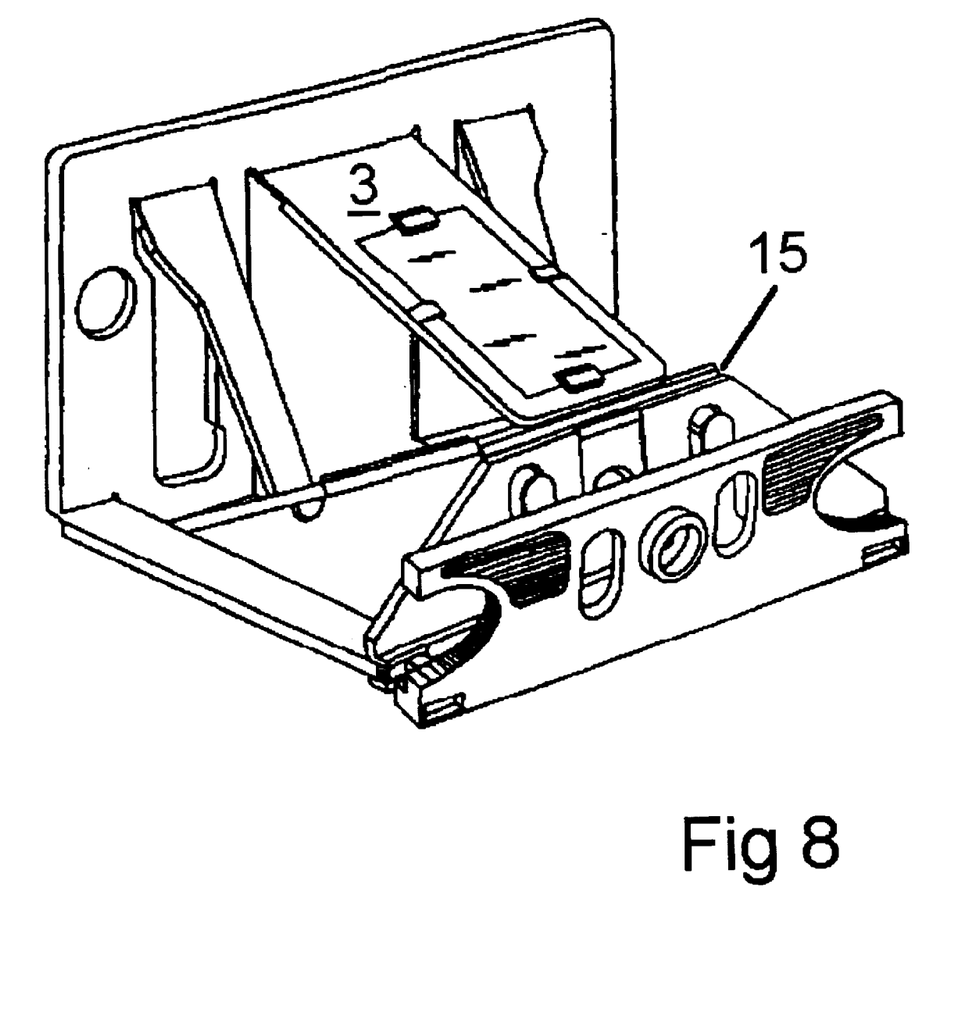
FIG. 8 depicts the microscope when set up for hand-held operation.

The microscope may also be configured into a configuration suitable for hand-held operation, as shown in FIG. 8. The hand-held configuration is quite similar to the upright, bench configuration, and differs only in that the hinged panel 3 is not inserted into the mirror opening 9, but remains resting against the outside of the stage 19. Thus, the specimen to be viewed, typically mounted on a microscope slide, is illuminated by direct light from a light source, such as a lamp or cloud or lighted window, without being deflected by the mirror, as in the upright configuration.

Figure 9:
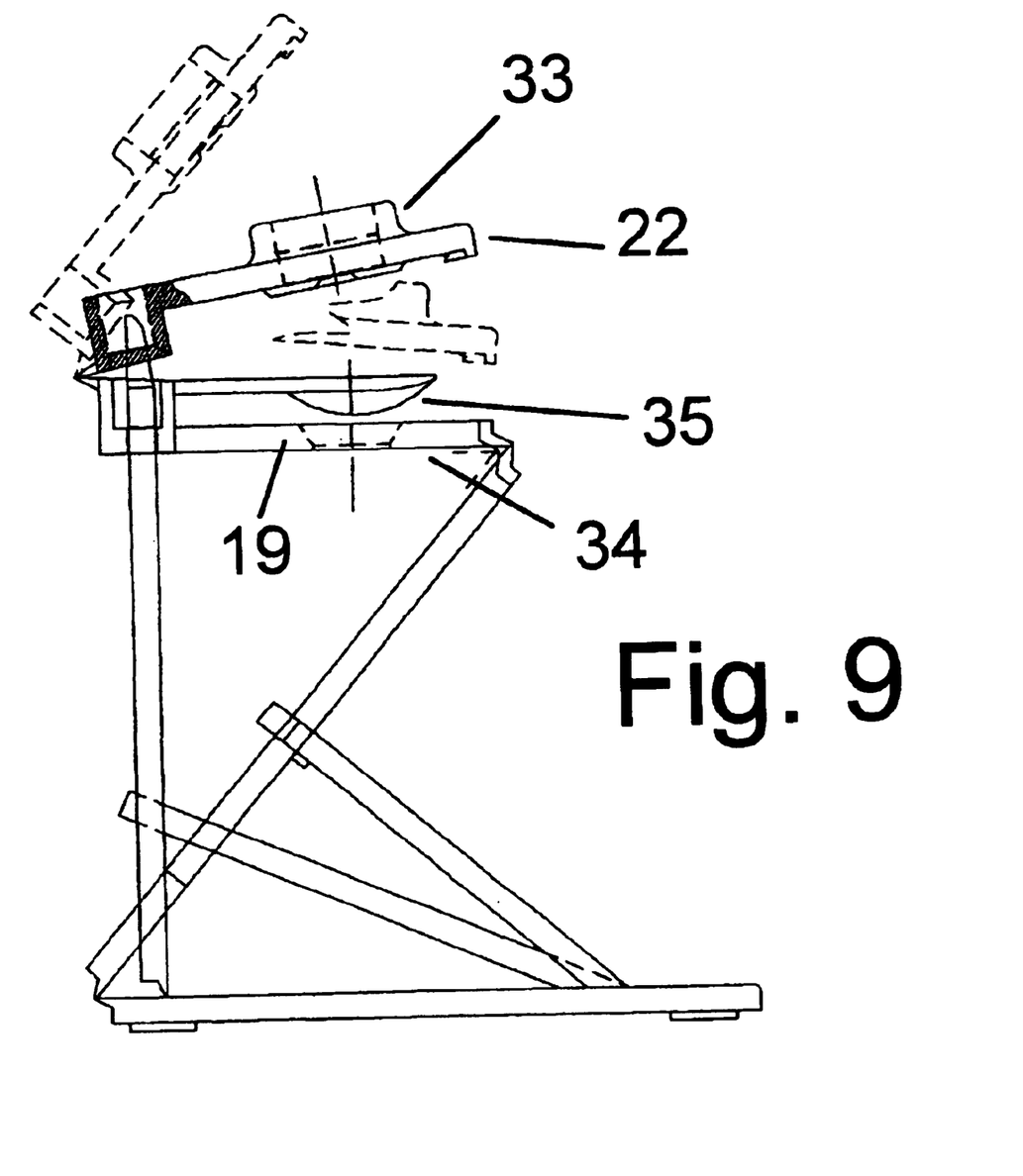
FIG. 9 depicts a side elevation view of the microscope.

In setting up the microscope for hand-held operation, the main difference is at the step shown in FIG. 2, where the hinged panel 3 is bent up. Rather than the acute angle shown in FIG. 2, the hinged panel is bent up to an angle of about 90 degrees as shown in FIG. 9. As a result, when the angle plate is bent away from the base, as shown in FIG. 3, the hinged panel is not inserted into the mirror opening 9, but remains resting against the angle plate 13 in proximity to the middle hinge 15. The hand-held configuration is shown in FIG. 8.

The microscope can also be converted to hand-held configuration after set-up into bench configuration has been completed. The user first applies a slight finger pressure to spread the inside struts apart. At the same time the base is pushed slightly away from the angle plate so as to disengage the tips of the inside struts to withdraw the mirror holder from the frame opening. The mirror holder is then pulled back so that it rests above the mirror opening. Finally, the internal struts are re-inserted into the slots on the angle plate, with the mirror holder resting on the middle hinge.

Operation

Referring now to FIG. 9 the upright microscope is placed on a flat support surface. A microscope slide is inserted under the stage clips 35. The operator's eye is brought to within close proximity to the eye lens housing 33 on eyepiece 22. Focusing is accomplished by compressing the eyepiece 22 with one or both thumbs against stage 19 while fingers are grasping the finger ribs 32 on the underside 34 of the angle plate. The finger ribs help keep the user's fingers from slipping during this operation. In practice, it is usually necessary to repeatedly compress and release the eyepiece, in smaller and smaller increments, until the desired focus achieved.

Because of the trapezoidal shape of the stage 19, the sides and ends of the slide are easily manipulated by using the fingers of either one or both hands. Parabolic slots 27 at the sides of the eyepiece 22, as seen in FIG. 5A, allow the user to pinch either one or both sides of the slide for positioning. Either one of these methods for adjusting the slide can be done with one hand while simultaneously focusing with the other. Oval slots 28 on top of eyepiece 22, as seen in FIG. 1A, allow further viewing of portions of the slide for specimen positioning. FIG. 7 shows the microscope in a generally focused position with the eyepiece 22 and the stage 19 approximately parallel.

The natural property of a plastic hinge, in this instance molded out of polypropylene, is to return to its original, unbent state. The hinge is thus said to possess a memory. This memory produces a constant spring tension between the eyepiece and the stage, tending to keep them apart. The tips of the external struts, inserted into the eyepiece slots, prevents the eyepiece and stage from exceeding a maximum angle. This stage/eyepiece interlock allows the eyepiece to be manually squeezed relative to the stage to focus the optics of the microscope so that the slides/specimens appear in focus to the user.

The mirror 1 is adjusted for the optimum illumination of the specimen by sliding protruding end 29 of the mirror holder 3, within the mirror opening 9, with the thumbs, while holding the microscope frame with fingers while looking through the eyepiece, and aiming the mirror at a light source. The mirror is thus positioned by maintaining the mirror holder in place by detents 30, on both sides of the mirror holder opening 9. Provision is made to allow the mirror opening to expand or contract as required when the mirror holder is moved from one detent pair to another, by means of expansion slots 31 on each side of the mirror opening 9.

The light, thus reflected by the mirror from the light source, passes through the hole in the substage recess 45, through the specimen and slide, and into the lens 3 mounted in the eyepiece receptacle 5.

Dismantling

To dismantle the microscope, the eyepiece 22 must first be manually grasped and pulled upward and back to its prior position. This disengages the eyepiece slots 26 from the hooked tip 23 of the external struts 16. The external struts 16 are then manually removed from the stage by pulling them away from each other, disengaging the slots 43 in the external struts from the slots 42 in the stage.

The internal struts 7 are disengaged by manually grasping both struts and spreading them apart with light pressure. This will release the tips of the internal struts 7 from the rectangular slots 12 in the angle plate, so that the angle plate 13 can be pulled away from the internal struts 7. The unit can then be returned to its flat configuration.

HAND-HELD OPERATION The foldable microscope is easily configured to form a hand-held microscope. In this configuration a specimen slide is examined by holding the microscope like a binocular, and aiming it directly at a light source, such as a light bulb, window, or cloud.

Accessories

Figure 6B:
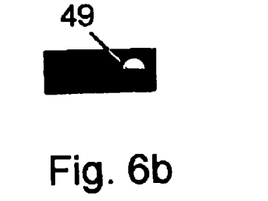
FIG. 6B depicts a polarizer tab, which is included as an accessory to the microscope.
Figure 6C:
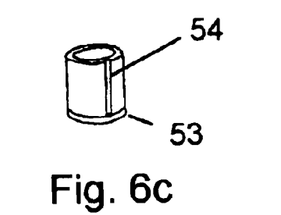
FIG. 6C depicts a polarizer eyepiece which is included as an accessory to the microscope.
Figure 6D:
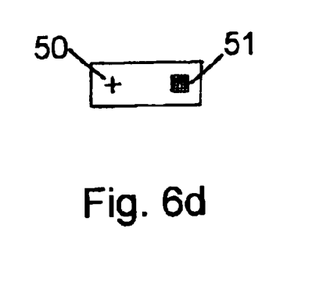
FIG. 6D depicts a reticle tab which is included as an accessory to the microscope.

The Reticle Tab, as shown in FIG. 6d, is manually inserted into the slot formed by a microslide and the sub-stage recess. It should be inserted lightly so that the end of the recess can be sensed. This will ensure that it is centered over the eye-lens/stage opening.

The reticle has two measuring gauges. The grid 51, with 1 mm squares and 0.5 mm dots, permits counting the number of occurrences of a particular characteristic in a specimen to calculate its density. The cross line 50, with 1 mm and 0.5 mm segments, permits measuring length and width of a particular portion of a specimen.

The Tab Pocket 44, which is mounted on the left side of the base, as shown in FIG. 6A, provides a storage receptacle for the Reticle Tab, or for the Polarizer Tab as shown in FIG. 6b, or both. Because these elements are thin, light, and small, the pouch guards against losing or misplacing them. The Tab Pocket is normally affixed to the base of the scope at the factory. However, it is available separately with peel-and-stick backing.

Reticle lines will often appear as shadow background lines to the specimen being examined. This occurs because of the difference in focal planes between the specimen and the tab due to thickness of the slide. This effect can be minimized by using thin slides, such as plastic encapsulating or thin cardboard. Also, microslides with permanent cover slips can be turned over so that the specimen and tab are essentially contiguous.

A two part, clear plastic hinged slide is also available as an accessory to the microscope. The hinged slide is used to instantly encapsulate a specimen for immediate examination. The specimen is simply placed inside the slide, which is then inserted under the stage clips with rigid side facing the eye-lens.

A Polarizer Adapter Kit is also available, and consists of two parts: the polarized eyepiece, containing a polarized filter, and the polarized tab. The kit allows the examination of any specimen under polarizing light filters.

The Polarizer Eyepiece, as shown in FIG. 6c, has a cylindrical housing that contains a polarizing filter at the lower end 53. This lower end is inserted fully into the lens housing 33 of the microscope eyepiece 22. A vertical groove 54 in the housing of the polarizer eyepiece shows the direction of the polarizing axis across the filter, The polarizer eyepiece may be rotated to change its axis relative to that of the Polarizing Tab for an angle range of 0–90" between the two axes. When not in use, The Polarizer Eyepiece may be stored in storage well 40 at the base of the microscope.

The Polarizer Tab, shown in FIG. 6B, is inserted into the slot formed by the specimen slide and the substage recess 45. Its polarizing axis runs in the direction of the tab's length. One end of the lab has a cutout creating a split field 49. When this end is inserted, one half the specimen is exposed to plain light while the other half is exposed to polarized light, giving a side by side comparison. As with The Reticle Tab, the Polarizer Tab should be inserted slowly in order to sense contact with the end of the slot. This ensures that the cutout is centered over the eye-lens/stage opening. When not in use, the Polarizer Tab may be stored in the Tab Pocket. If this tab has a protective liner on one or both sides, it must be peeled off before use.

Figure 10A:
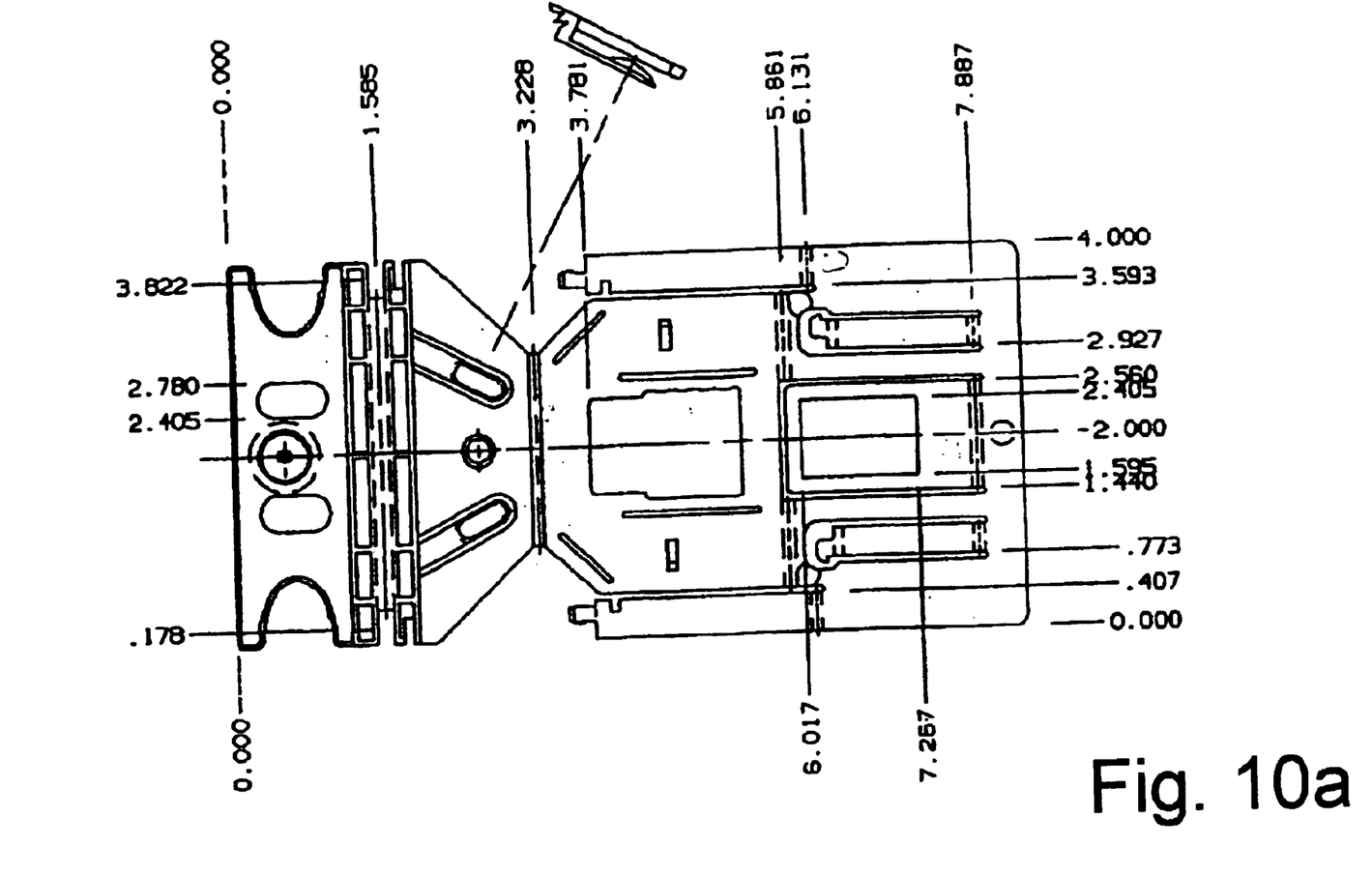
FIG. 10A depicts a top plan view of the microscope blank, showing dimensions.
Figure 10B:
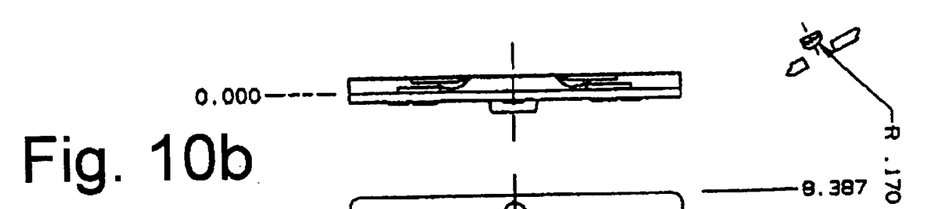
FIG. 10B depicts an end elevation view of the microscope blank, showing dimensions.
Figure 10C:
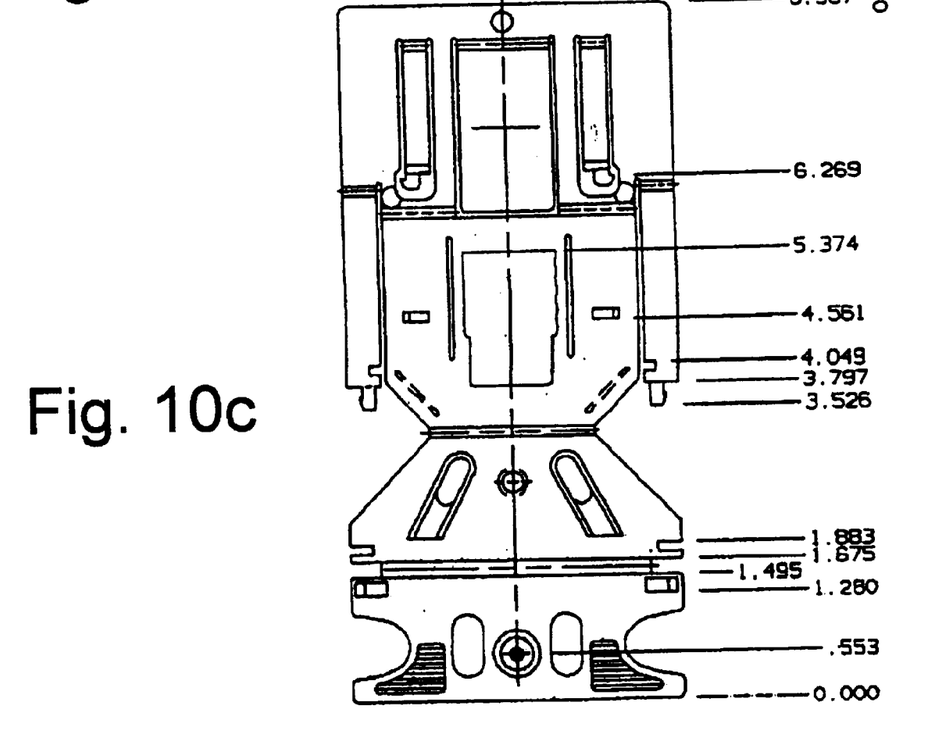
FIG. 10C depicts a bottom plan view of the microscope blank, showing dimensions.

The dimensions of the preferred embodiment of the invention are shown in the mechanical drawings of FIG. 10a, 10b, and 10c. FIG. 10a is a top plan view of the top side of the unassembled microscope. FIG. 10b is an end elevation view, and FIG. 10c is a bottom plan view.

While the invention has been described with reference to specific embodiments, it will be apparent that improvements and modifications may be made within the purview of the invention without departing from the scope of the invention defined in the appended claims.

What is claimed is:

1. A foldable elementary microscope, comprising the following elements, integrally formed in a substantially planar substrate:

(a) an eyepiece having a lower edge;

(b) a stage having an upper and lower edge;

(c) an upper hinge attached at an upper edge to the lower edge of the eyepiece, and at a lower edge to the upper edge of the stage;

(d) an angle plate having an upper and lower edge;

(e) a middle hinge attached at an upper edge to the lower edge of the stage, and at a lower edge to the upper edge of the angle plate;

(f) a base having an upper edge;

(g) a lower hinge attached at an upper edge to the lower edge of the angle plate, and at a lower edge to the upper edge of the base; and (h) a mirror slideably affixed to a mirror mounting panel rotatingly affixed to the base by a hinge.

2. The microscope of claim 1, wherein the upper, middle, and lower hinges further comprise living hinges.

3. The microscope of claim 2, wherein:

(a) the eye piece is folded to a maximum acute first angle relative to the stage, the angle adjustable by the user;

(b) the stage is folded at a second angle relative to the angle plate;

(c) the angle plate is folded at a third angle relative to the base, and the microscope further comprises:

(c) means to restrain the eye piece at an angle less than or equal to said maximum acute angle;

(d) means to affix the angle between the stage and the angle plate at the second angle;

(e) means to affix the angle between the angle plate and the base at the third angle.

4. The microscope of claim 3, further comprising one or more external struts, each attached to the planar substrate by an external strut hinge, and one or more internal struts, each attached to the planar substrate by an internal strut hinge, and wherein each external strut mates with a corresponding slot in proximity to the stage, and wherein each internal strut mates with a corresponding slot in proximity to the angle plate.

5. The microscope of claim 4, further comprising two or more stage clips integrally formed from the stage.

6. The microscope of claim 5, wherein a mirror opening is formed in the angle plate, and the mirror mounting panel is slideably affixed within mirror opening.

7. The microscope of claim 6, further comprising a multiplicity of detents within the mirror opening.

8. The microscope of claim 7, wherein the stage has a trapezoidal shape.

9. The microscope of claim 8, wherein the stage further comprises a substage recess for holding an element selected from the family which consists of:

(a) polarizer tabs; and (b) reticle tabs.

10. The microscope of claim 9, wherein:

(a) the means to restrain the eye piece at an angle less than or equal to said maximum acute angle; and (b) the means to affix the angle between the stage and the angle plate at the second angle, and the means to affix the angle between the angle plate and the base at the third angle are all removable means.

11. A foldable elementary microscope, comprising the following elements:

(a) an eyepiece having a lower edge;

(b) a stage having an upper and lower edge;

(c) an upper hinge attached at an upper edge to the lower edge of the eyepiece, and at a lower edge to the upper edge of the stage;

(d) an angle plate having an upper and lower edge;

(e) a middle hinge attached at an upper edge to the lower edge of the stage, and at a lower edge to the upper edge of the angle plate;

(f) a base having an upper edge;

(g) a lower hinge attached at an upper edge to the lower edge of the angle plate, and at a lower edge to the upper edge of the base; and (h) a mirror affixed to a mirror mounting panel rotatingly affixed to the base by a hinge.

12. The microscope of claim 11, wherein the upper, middle, and lower hinges further comprise living hinges.

13. The microscope of claim 12, wherein:

(a) the eye piece is folded to a maximum acute first angle relative to the stage, the angle adjustable by the user;

(b) the stage is folded at a second angle relative to the angle plate;

(c) the angle plate is folded at a third angle relative to the base, and the microscope further comprises:

(c) means to restrain the eye piece at an angle less than or equal to said maximum acute angle;

(d) means to affix the angle between the stage and the angle plate at the second angle;

(e) means to affix the angle between the angle plate and the base at the third angle.

14. The microscope of claim 13, further comprising one or more external struts, each attached to the planar substrate by an external strut hinge, and one or more internal struts, each attached to the planar substrate by an internal strut hinge, and wherein each external strut mates with a corresponding slot in proximity to the stage, and wherein each internal strut mates with a corresponding slot in proximity to the angle plate.

15. The microscope of claim 14, further comprising two or more stage clips integrally formed from the stage.

16. The microscope of claim 15, wherein a mirror opening is formed in the angle plate, and the mirror mounting panel is slideably affixed within mirror opening.

17. The microscope of claim 16, further comprising a multiplicity of detents within the mirror opening.

18. The microscope of claim 17, wherein the stage has a trapezoidal shape.

19. The microscope of claim 18, wherein the stage further comprises a substage recess for holding an element selected from the family which consists of:

(a) polarizer tabs; and (b) reticle tabs.

20. The microscope of claim 19, wherein:

(a) the means to restrain the eye piece at an angle less than or equal to said maximum acute angle; and (b) the means to affix the angle between the stage and the angle plate at the second angle, and the means to affix the angle between the angle plate and the base at the third angle are all removable means.

* * * * *